Sept. 8, 1931. F. CLARK 1,821,963
TRANSFER MECHANISM FOR CAN FILLING MACHINES
Original Filed March 21, 1928  3 Sheets-Sheet 3
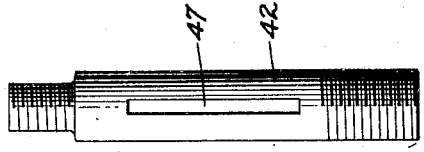
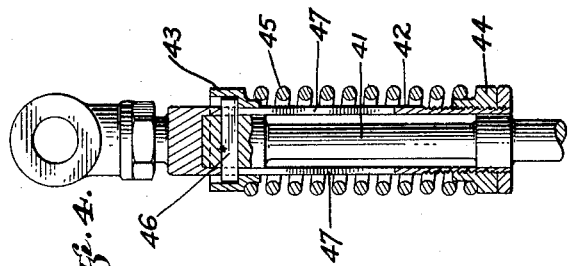
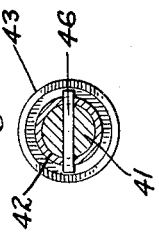
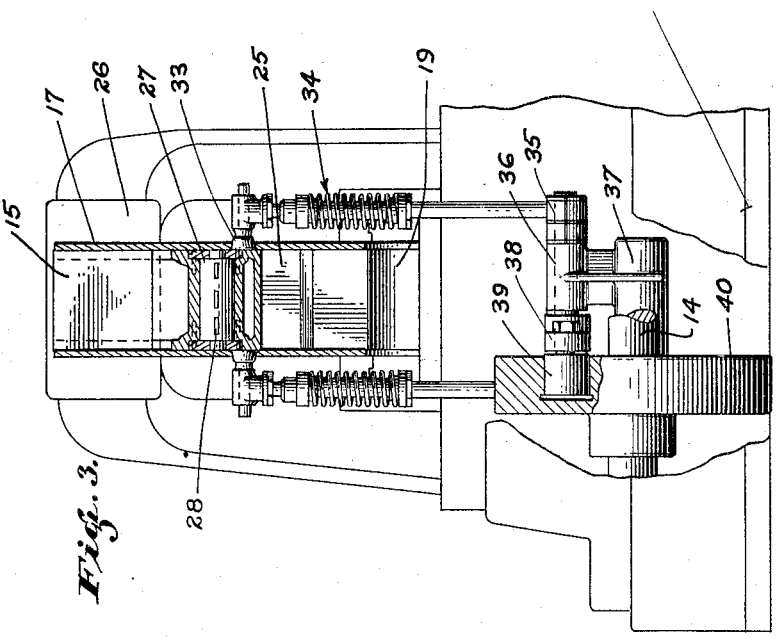
INVENTOR.
Frederick Clark.
BY Townsend Loftus and Abbett
ATTORNEYS.

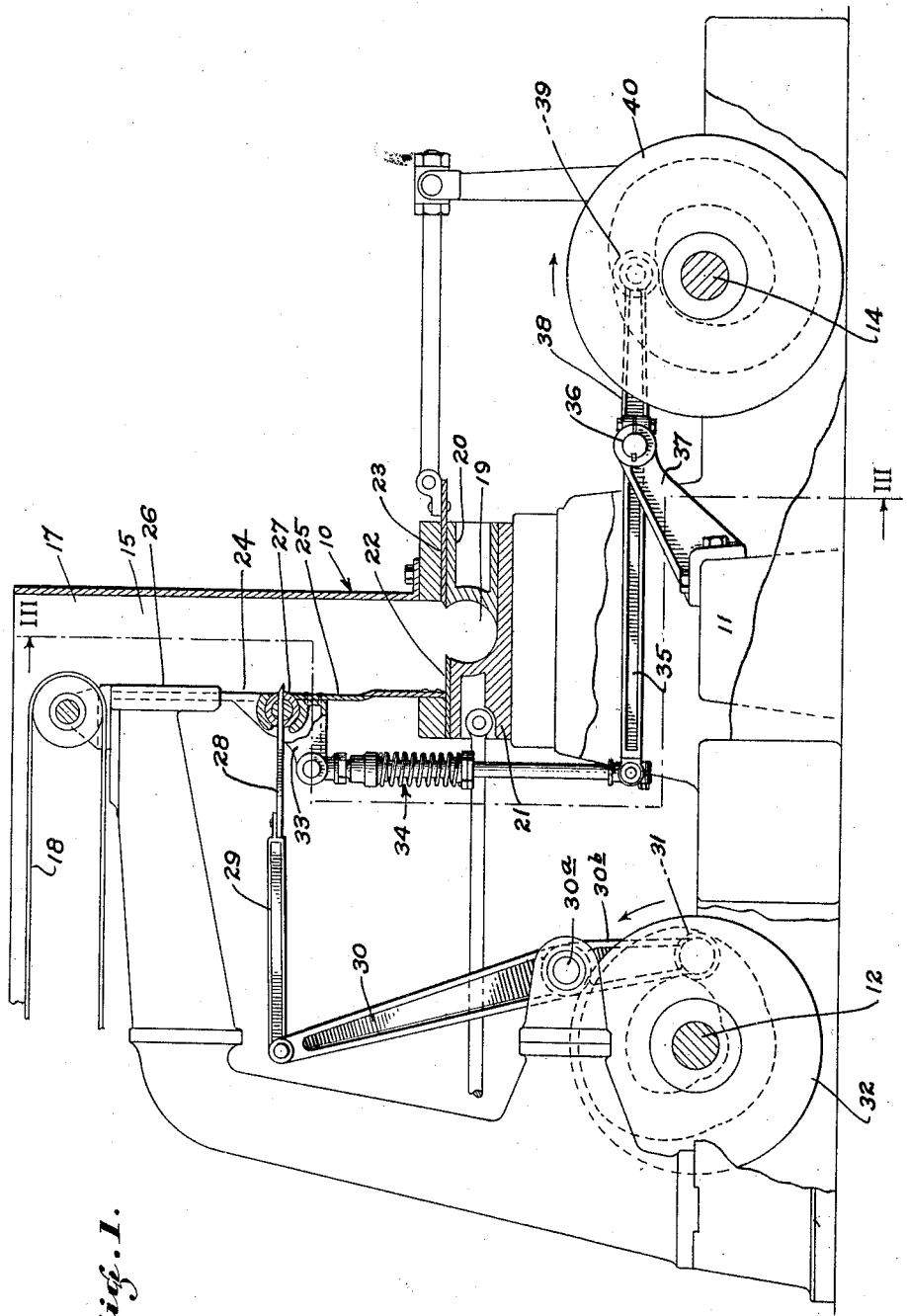

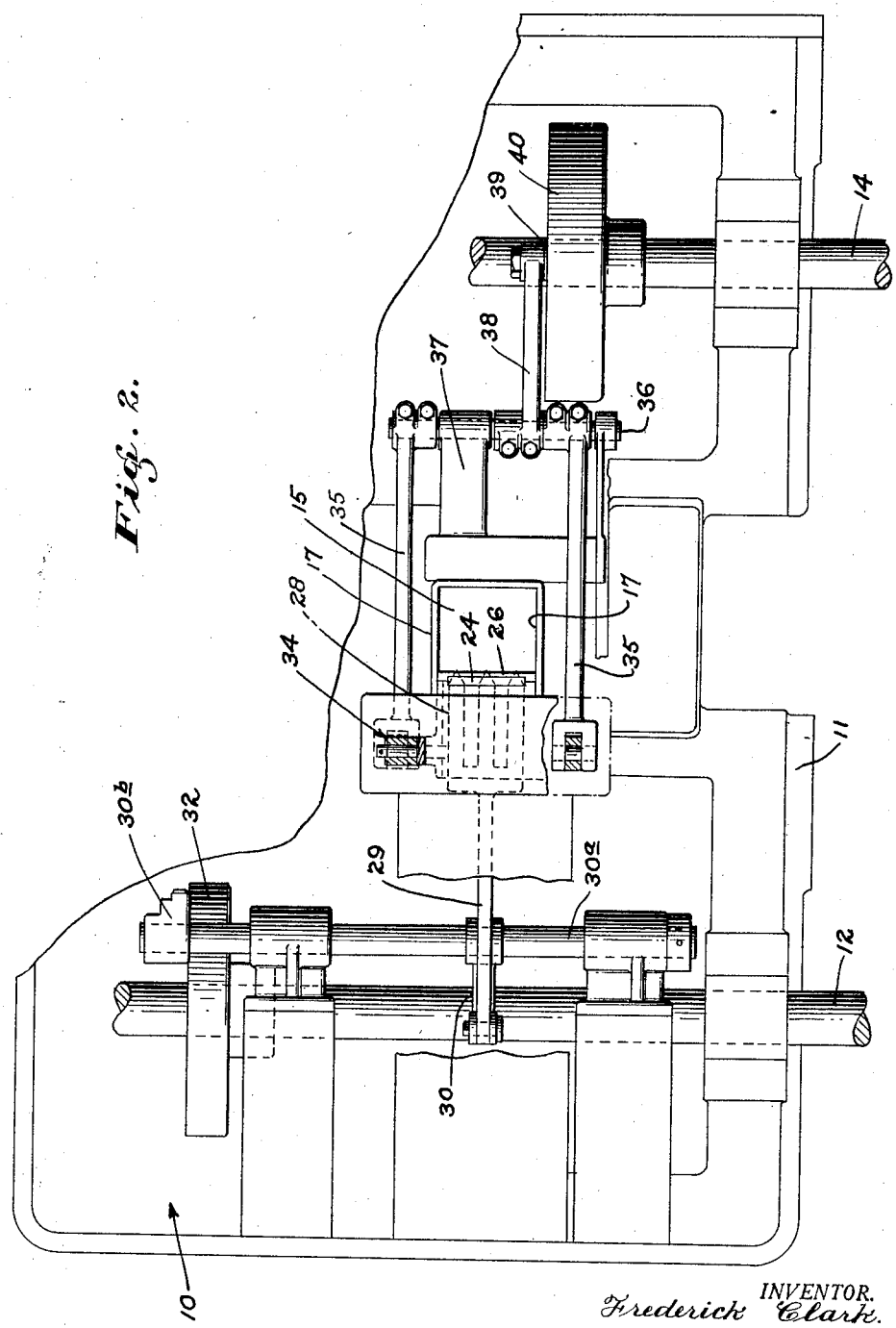

Patented Sept. 8, 1931

1,821,963

UNITED STATES PATENT OFFICE

FREDERICK CLARK, OF ALAMEDA, CALIFORNIA, ASSIGNOR TO ALASKA PACKERS ASSOCIATION, OF SAN FRANCISCO, CALIFORNIA, A CORPORATION OF CALIFORNIA

TRANSFER MECHANISM FOR CAN FILLING MACHINES

Application filed March 21, 1928, Serial No. 263,553. Renewed July 13, 1931.

This invention relates to can filling machines of the type disclosed in my prior application entitled "Can filling machine," filed January 10, 1927, Ser. No. 160,075.

In this prior machine fish is delivered in can lengths to a hopper and then transferred into a compression chamber which acts to compress the fish into a charge the size of a can, mechanism being provided for transferring the charge of fish from the chamber into the can. To feed the fish into the compression chamber a fork is provided which is operated by a cam. This fork is first projected into the fish in the measuring box and then moved toward the compression chamber by means of a tumbler to press the fish into the compression chamber. Thereafter the fork is withdrawn and returned to its starting position.

It is the principal object of the present invention to provide improved mechanism for delivering fish from the hopper, into which it is initially placed, to the compression chamber.

In carrying this object into practice I provide a slide which forms a portion of one wall of the hopper into which the fish are delivered. This slide is provided with a laterally disposed roller through which the tines of a fork may reciprocate. This fork is projected into the fish by means of a cam mechanism and the slide is then operated by means of a cam to draw the fork toward the compression chamber of the machine, so that the fork will press the fish within the compression chamber. The cam mechanism of the fork then operates to withdraw the fork and return the slide and fork to their starting positions.

One form which the invention may assume is exemplified in the following description and illustrated by way of example in the accompanying drawings, in which:

Fig. 1 is a fragmentary view in side elevation of a can filling machine such as disclosed in the prior application referred to with certain parts thereof in section and disclosing my improved mechanism.

Fig. 2 is a fragmentary view of the can filling machine in plan and disclosing the manner in which my improved mechanism is associated therewith.

Fig. 3 is a fragmentary view in vertical section taken on line III—III of Fig. 1.

Fig. 4 is a view in central vertical section through one of the connections by means of which the slide is connected to its operating mechanism.

Fig. 5 is a view in elevation of one of the parts of the connection disclosed in the preceding figure.

Fig. 6 is a cross-sectional view through one of the connections by means of which the slide is connected to its operating mechanism.

Referring more particularly to the accompanying drawings, 10 generally indicates a fish cutting machine having a frame 11. In the present instance I have not illustrated the entire machine but only those parts necessary to a thorough understanding of the construction and operation of the mechanism embodying the present invention. The machine includes a pair of cam shafts 12 and 14 which when the machine is in operation are driven continuously at equal speeds and in opposite directions. Arranged centrally of the machine is what I prefer to term a measuring box 15. This measuring box is vertically arranged and is substantially rectangular in cross section. The opposite ends of the measuring box are open and projecting within the upper end thereof is a conveyor 18 which is adapted to deliver lengths of fish thereto. The dimension between the sides 17 of the measuring box is substantially equal to the length of a can and the lengths of fish are can length and are delivered transversely within the measuring box by means of the conveyor 18. The conveyor 18 operates at a speed to maintain the measuring box 15 substantially full of fish.

Beneath the lower end of the measuring box 15 is what I prefer to term a compression chamber 19 formed by means of a stationary block 20 and a reciprocable block 21. The inner ends of these blocks are concave so that the compression chamber will be substantially cylindrical and conform to the diameter of a can. The reciprocable block 21 carries a knife 22 and at the opposite side I provide a reciprocable knife 23. These knives cooperate to cut off fish pressed within the compression chamber 19, so that the charge of fish in the compression chamber may be transferred to a can.

The construction and operation of this mechanism together with the other mechanisms of the machine are described, illustrated and claimed in my copending application hereinbefore referred to. I intend in the present application to describe the machine and its operation just sufficiently to enable the operation of the mechanism embodying the invention to be clearly understood.

One side wall 17 of the measuring box 15 is cut-away to provide an opening 24. Forming a closure for this opening is a slide 25 guided for vertical reciprocation in a guide 26 carried by the frame of the machine. This slide 25 is fitted with a transverse roller 27 which is adapted to freely revolve. Formed transversely through the roller 27 are openings adapted to slidably receive the tines of a fork 28. This fork 28 is rigidly connected to a connecting rod 29 arranged horizontally. The outer end of this connecting rod 29 is pivotally connected to an arm 30 which is secured on a shaft 30ª carried by the frame 11. A cam arm 30ᵇ is also secured on the shaft 30ª and carries a cam roller 31 operating in the groove of a box cam 32 secured on the shaft 12. This groove of the cam 32 is so formed as to operate the fork through the arm 30 at the proper intervals.

The fork is first projected into the box 15 and then the slide 25 is drawn downwardly so that the fork will act to press the fish in the compression chamber 19. It is obvious that when the slide is reciprocated, the connecting rod 29 carrying the fork 28 swings about its pivotal connection with the cam arm 30. This movement of the fork is permitted by the roller 27 through which the fork 28 projects.

To operate the slide 25, it is formed with a pair of bearing lugs 33 arranged at opposite sides of the slide. These bearing lugs 33 are each connected by means of a vertical connecting member 34 to horizontally disposed arms 35. The other ends of these arms 35 are keyed to a short shaft 36 journalled in bearings 37 carried by the frame 11. Also keyed at one end on this shaft 36 is a cam arm 38, the other end of which is fitted with a cam roller 39 operating in the groove of a box cam 40 secured on the shaft 14. Operation of this cam 40 oscillates the cam arm 38 and through the medium of the rock shaft 36 oscillates the arms 35. Oscillation of these arms will be translated into vertical reciprocation of the vertical connecting members 34 and as the upper ends of these members are connected to the slide 25, the latter will be reciprocated. The reciprocating movement of the slide 25 is, however, due to the formation of the cam 40, in timed relation to the operation of the fork 28 and to the other mechanisms of the machine.

It is preferred that the vertical connecting members 34 be slightly elastic so that the fish will be pressed into the compression chamber 19 by a slightly yielding medium. For this reason the connecting members each comprises a rigid member 41 which is connected at its lower end to the adjacent arm 35. The upper end of this member projects within a cylinder 42 which is connected at its upper end to the adjacent bearing lug 33 on the slide 25. The member 41 is reciprocably mounted in the cylinder 42. Slidably disposed on the exterior of the cylinder and at the upper end thereof is a collar 43. At the lower end of the cylinder a collar 44 is fixed thereon. A compression spring 45 is disposed between the fixed collar 44 at the lower end of the cylinder and the movable collar 43 at the upper end thereof. The member 41 is fitted with a transversely arranged key 46 which projects outwardly through slots 47 in the opposite sides of the cylinder 42 and engages the movable collar 43 so that relative movement between the cylinder 42 and the member 41 must be accomplished after overcoming the spring 45.

Therefore, when the arms 35 move downwardly tending to draw the slide 25 downwardly, the movement is transmitted first to the members 41 of the vertical connections 34. These members 41 through the medium of the springs 45 will transmit the movement to the cylinders 42 and as these cylinders are connected to the slide 25, the latter will be operated. However, it is seen that due to these elastic connections the fork 28 will yieldingly press the fish within the compression chamber 19.

In operation of the device, assuming that the parts are in the position shown in Fig. 1, the cam 32 will actuate the arm 30 to cause the fork 28 to penetrate into the fish in the measuring box 15. After the fork has penetrated into the fish the cam 40 through the medium of the arms 38 and 35 and the vertical connections 34 will move the slide 25 downwardly, causing the fork 28 to yieldingly press the fish into the open compression chamber 19. The knives 22 and 23 and the reciprocable block 21 then operate to form a charge of fish in the compression chamber. This fish is transferred to a can as disclosed in the prior application referred to. The cam 32 then causes the fork 28 to be withdrawn from within the measuring box and thereafter the cam 40 actuates the slide 25 to return the same to its vertical position. The slide 25, however, always forms a closure for the opening in the end of the measuring box.

From the foregoing it is obvious that I have provided an improved mechanism for use in feeding fish to the compression chamber of can filling machines and while I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

In a machine of the character described, a vertically arranged receptacle for receiving cut portions of fish, a compressing chamber at the lower end of said receptacle and in communication therewith, a vertically reciprocable slide forming a portion of one of the side walls of said receptacle, guide means forming a part of the receptacle for guiding said slide for vertical reciprocation, a transverse roller extending transversely of the slide, said slide having a transverse opening with which the roller aligns, a horizontally disposed fork slidable through said roller whereby it may be projected into the receptacle or withdrawn, a connecting rod connected at one end to the outer end of the fork, an oscillating arm to one end of which the other end of the connecting rod is connected, said arm being pivoted at a point intermediate its ends, a roller fitted to the other end of the arm, a rotatable cam mounted on the frame and formed with a cam groove to which said roller on the arm is engaged, a second cam carried by the frame and also formed with a cam groove, a pair of oscillating arms arranged horizontally, a transverse shaft carried by the frame and to which said arms are keyed, another arm keyed at one end to said shaft, a roller at the other end of said latter arm engaging the groove of said second cam, vertical connections between the slide and the forward ends of said horizontal arms, said vertical connections being yieldable, said cams operating in synchronism to project the fork into the receptacle when the slide is in its uppermost position and then moving the slide from its upper position to its lower position, withdraw the fork and return the slide to its upper position.

FREDERICK CLARK.